United States Patent
Cohen et al.

(10) Patent No.: US 8,468,161 B2
(45) Date of Patent: Jun. 18, 2013

(54) DETERMINING A SEASONAL EFFECT IN TEMPORAL DATA

(75) Inventors: Ira Cohen, Modiin (IL); Kobi Eisenberg, Yehud (IL); Liat Ashkenazi, Yehud (IL); Avishai Krepel, Yehud (IL); Marina Lyan, Modiin (IL); Michael Rozman, Rosh Haain (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/259,020

(22) PCT Filed: Jul. 14, 2009

(86) PCT No.: PCT/US2009/050513
§ 371 (c)(1), (2), (4) Date: Sep. 22, 2011

(87) PCT Pub. No.: WO2011/008198
PCT Pub. Date: Jan. 20, 2011

(65) Prior Publication Data
US 2012/0016886 A1    Jan. 19, 2012

(51) Int. Cl.
*G06F 17/30*    (2006.01)

(52) U.S. Cl.
USPC ............. 707/749; 707/736; 706/12; 706/14; 714/100

(58) Field of Classification Search
None
See application file for complete search history.

(56) References Cited

U.S. PATENT DOCUMENTS

| 6,189,005 | B1 * | 2/2001 | Chakrabarti et al. | 1/1 |
| 2002/0107841 | A1 * | 8/2002 | Hellerstein et al. | 707/3 |
| 2004/0123191 | A1 | 6/2004 | Salant et al. | |
| 2005/0066241 | A1 | 3/2005 | Gross et al. | |
| 2006/0195423 | A1 * | 8/2006 | Sastry et al. | 707/3 |
| 2006/0195444 | A1 * | 8/2006 | Sastry et al. | 707/6 |
| 2006/0224356 | A1 | 10/2006 | Castelli et al. | |
| 2007/0226626 | A1 * | 9/2007 | Yap et al. | 715/733 |
| 2009/0024427 | A1 | 1/2009 | Shan | |
| 2009/0182701 | A1 * | 7/2009 | Berger et al. | 706/58 |
| 2009/0271406 | A1 * | 10/2009 | Wong et al. | 707/6 |
| 2009/0276469 | A1 * | 11/2009 | Agrawal et al. | 707/202 |
| 2010/0293124 | A1 * | 11/2010 | Berger et al. | 706/20 |

OTHER PUBLICATIONS

James F. Allen, "Maintaining Knowledge about Temporal Intervals", ACM, 1983.*
Cao et al, "Spatio-temporal Data Reduction with Deterministic Error Bound", 2005.*
Donjerkovic et al, "Dynamic Histograms: Capturing Evolving Data Sets", 1999.*
Max J. Egenhofer, "Temporal Relations of Intervals with a Gap", 2007.*
Faloutsos et al, "Fast Sequence Matching in Time-Series Databases", 1994.*

(Continued)

*Primary Examiner* — Apu Mofiz
*Assistant Examiner* — Hung Le

(57) ABSTRACT

To determine a seasonal effect in temporal data, for each of a plurality of candidate seasons, the following is performed. An interval is defined for the corresponding candidate season. The interval is divided into plural buckets containing respective sets of the temporal data, and statistical measures for corresponding buckets are computed. The computed statistical measures are used to compute a score for the corresponding candidate season. Scores computed for corresponding candidate seasons are used for identifying which of the candidate seasons represents the seasonal effect of the temporal data.

16 Claims, 4 Drawing Sheets

OTHER PUBLICATIONS

Frank Hoppner, "Discovery of Temporal Patterns Learning Rules about the Qualitative Behavior of Time Series", 2007.*
Goh et al, "Effect of Temporal Interval Between Scan Acquisitions on Quantitative Vascular Parameters in Colorectal Cancer: Implications for Helical Volumetric Perfusion CT Techniques", 2008.*
Guha et al, "Data-Streams and Histograms", ACM, 2001.*
Han et al, "Efficient Mining of Partial Periodic Ptterns in Time Series Database", 1999.*
Hetzer et al, "Integrated Information System for Inter-Domain QoS Monitoring, Modelling and Verification", 2002.*
Lacouture et al, "Absolute Identification of Temporal Intervals: Preliminary Data", 2001.*
Laxman et al, "Discovering Frequent Episodes and Learning Hidden Markov Models: A Formal Connection", IEEE, 2005.*
Laxman et al, "A survy of temporal data mining", 2006.*
Lee et al, "Mining temporal interval relational rules from temporal data", 2008.*
Ramaswamy et al, "On the Discovery of Interesting Patterns in Association Rules", Proceedings of the 24th VLDB Conference, 1998.*
Rossana et al, "Temporal Aggregation and Economic Time Series", Jornal of Business & Economic Statistics, col. 13, No. 4, 1995.*
Stephen M. Shellman, "Time Series Intervals and Statistical Inference: The Effects of Temporal Aggregation on Event Data Analysis", 2004.*
Sitzmann et al, "Improving Temporal Joins Using Histograms", 2000.*
Toumba et al, "Pattern based spatio-temporal Quality of Service analysis for capacity planning", 2003.*
Xiaobai Yao, Research Issues in Spatio-temporal Data Mining 2003.*
Kawasaki et al., A Model Selection Approach to Detect Seasonal Unit Roots, Dec. 9, 1996 (20 pages).
Ira Cohen et al., HP, Capturing, Indexing, Clustering, and Retrieving System History, Oct. 2005 (15 pages).
Gunjan K. Gupta et al., Detecting Seasonal Trends and Cluster Motion Visualization for Very High Dimensional Transactional Data, Apr. 2001 (17 pages).
Bianca Zadrozny et al., Obtaining Calibrated Probability Estimates from Decision Trees and Naive Bayesian Classifiers, Jun. 2001 (8 pages).

* cited by examiner

DETERMINING A SEASONAL EFFECT IN TEMPORAL DATA

BACKGROUND

To better understand operations within an enterprise (such as a company, educational organization, government agency, and so forth), the enterprise may collect information regarding various aspects of such operations. For example, monitors may be added to information technology (IT) systems to gather data during operation of the IT systems. The enterprise may also collect information regarding business aspects of the enterprise, such as information regarding offerings (goods and/or services) provided by the enterprise.

It is desirable to analyze the data to perform anomaly detection, such as to detect for failure conditions, errors, or any other condition that the enterprise may wish to address. However, such data analysis is complicated by presence of seasonality (or seasonal effects) in received data.

BRIEF DESCRIPTION OF THE DRAWINGS

Some embodiments of the invention are described with respect to the following figures.

DETAILED DESCRIPTION

To allow for accurate analysis of temporal data collected regarding an enterprise, it is desired that seasonal effects (or seasonality) of the temporal data be identified. A seasonal effect refers to a time-dependent pattern in the temporal data collected over time (in a time series), where the pattern tends to repeat every season (or cycle) of a certain length. The length can be seconds, minutes, hours, days, months, years, and so forth. Seasonal behavior in the temporal data can be based on different usage patterns, internal processes of systems, or other factors. For example, user volume often shows daily and weekly cycles, corresponding to typical access patterns to the system.

Without identifying seasonality in the temporal data, some analysis performed on the temporal data may not produce accurate results, such as false alarms. Analysis may be performed on temporal data for anomaly detection, such as to identify failure conditions, errors, or any other condition that the enterprise may wish to address.

The seasonality detection algorithm according to some embodiments does not assume that seasonal effects are based on a static season, such as an hour, day, or week. Instead, the seasonality detection algorithm according to some embodiments is able to consider seasons of arbitrary varying lengths, and to identify one of the seasons representing the seasonality effect in the temporal data. For example, different possible seasons considered can start at one hour and continue in increments of an hour until some maximum season size (e.g., a week, month, or year).

An error score is used to assist in selection of one of the seasons as representative of the seasonality in the temporal data, where the error score is derived based on statistical measures computed based on the temporal data while taking into account a corresponding season. Thus, for multiple seasons being considered (candidate seasons), multiple corresponding error scores are produced. The computation of the error scores is performed in different ways depending upon whether the temporal data is continuous temporal data or discrete temporal data (as discussed further below). The candidate season associated with a lowest (or most optimal) error score is selected as the most likely to represent the seasonal effect in the temporal data. In another embodiment, instead of using error scores, likelihood scores can be used instead.

The seasonality detection algorithm according to some embodiments is able to perform seasonality identification even if there are gaps in the temporal data. In addition, the seasonality detection algorithm is able to tolerate noisy input data relatively well. Moreover, the seasonality detection algorithm works on temporal data (continuous or discrete) without fixed (regular) sampling intervals.

Figure 1:
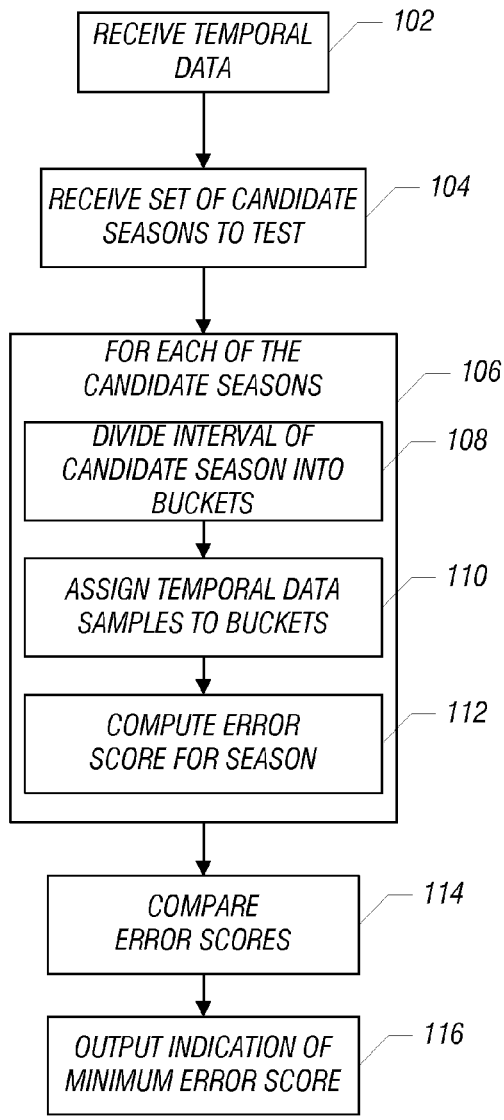
FIG. 1 is a flow diagram of a process of detecting seasonality in temporal data, according to an embodiment.

FIG. 1 is a flow diagram of the seasonality detection algorithm for identifying seasonality in temporal data, according to an embodiment. As shown in FIG. 1, temporal data is received (at 102). The received temporal data is in the form of a time series of data, which includes data values along time points. The temporal data can be collected by one or more monitors, for example, such as monitors in computer systems, storage systems, network systems, and so forth. Alternatively, the temporal data can be business data associated with an enterprise. Techniques according to some embodiments are applicable to any type of temporal data.

The seasonality detection algorithm also receives (at 104) a set of candidate seasons to test. For example, the candidate seasons can be seasons within a range of hours from 0 to some target number of hours. Thus, the candidate seasons can be a 1-hour season, a 2-hour season, a 4-hour season, a 15-hour season, a 40-hour season, and so forth. The number of candidate seasons tested can be relatively large, in view of the fact that the seasonality detection algorithm is relatively simple and thus can be performed in a timely fashion. By being able to consider a relatively large number of candidate seasons of arbitrary lengths, more accurate identification of the seasonality in the temporal data can be achieved. Each candidate season is referred to as season k, where k=1 to numSeasons, and where numSeasons$\geq$2 represents the number of seasons being considered.

Figure 2:
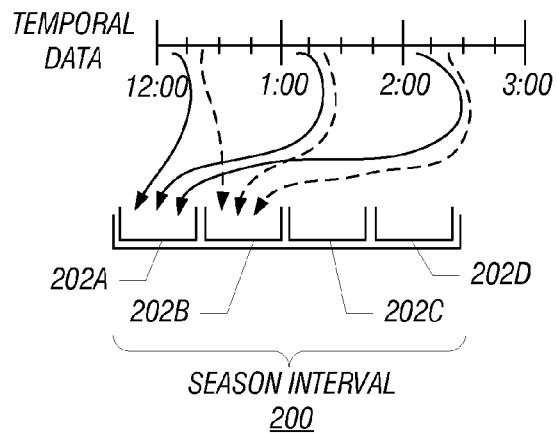
FIG. 2 illustrates mapping between temporal data and corresponding buckets, according to an embodiment.

Block 106 in FIG. 1 depicts processing to be performed for each of the candidate seasons of the set. The interval of the season being considered is divided (at 108) into plural buckets i (i=1 to $N_{b_k}$, where $N_{b_k} \geq 2$ represents the number of buckets in season k). For example, if the season being considered is a 1-hour season, then the interval is one hour, and this interval can be divided into 15-minute buckets. FIG. 2 shows an example of dividing a season interval 200 into four 15-minute buckets 202A, 202B, 202C, and 202D. For other seasons having different intervals, different length buckets can be identified.

Next, the samples in the received temporal data are assigned (at 110) to the corresponding buckets, based on the time of each sample. The time of a particular sample falls within one of the buckets. In the example above, if the time of the particular sample occurs between 15 minutes and 29 minutes after the hour, then the particular sample would be assigned to the second bucket 202B in FIG. 2. This is illustrated in FIG. 2, where all data samples taken in the first quarter after the hour are assigned to the bucket 202A, all data samples taken in the second quarter after the hour are assigned to the bucket 202B, all data samples taken in the third quarter after the hour are assigned to the bucket 202C, and all data samples taken in the fourth quarter after the hour are assigned to the bucket 202D. Thus, as shown in FIG. 2, a data sample taken between 12:00 and 12:14 is assigned to the bucket 202A, a data sample taken between 1:00 and 1:14 is assigned to the bucket 202A, and a data sample taken between 2:00 and 2:14 is assigned to the bucket 202A.

Next, an error score for season k, error(k), is computed (at 112) based on the data samples in the buckets of season k. To determine an error score, different processing is performed depending on whether the temporal data is continuous temporal data or discrete temporal data, as described in connection with FIGS. 4 and 5. Discrete temporal data refers to data having less than some predefined number (e.g., 10) of discrete values.

The processing of block 106 is repeated for each of the candidate seasons considered, such that corresponding error scores are produced for corresponding candidate seasons.

The error scores of the candidate seasons are then compared (at 114). An indication of the minimum error score can then be output (at 116). For example, the error scores of the corresponding candidate seasons may be stored in an error vector, and the indication that is output at 116 can be an index into the error vector. The output index (or other indication) that identifies a corresponding season can then be used in later processing to identify the seasonality of the temporal data. In a different embodiment, instead of selecting the minimum error score, a score having another optimal value (e.g., maximum score) can be selected—the score with "optimal" value depends on the type of score calculated.

Figure 3:
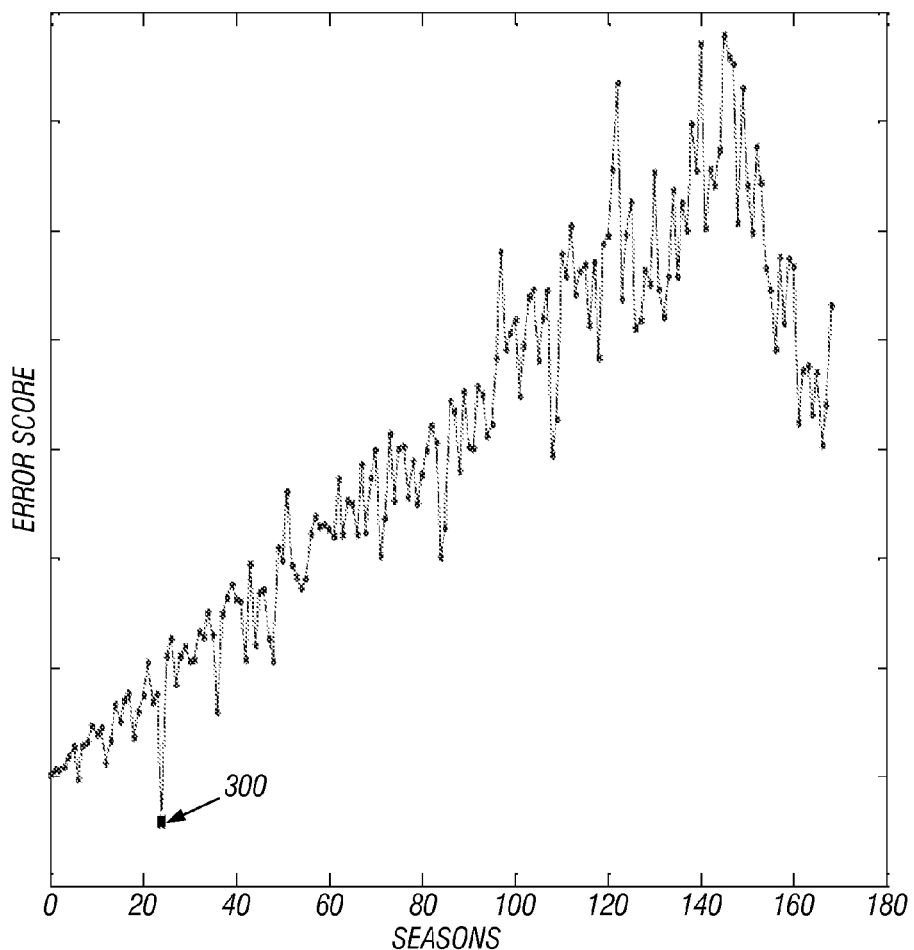
FIG. 3 is a graph illustrating error scores as a function of different seasons, computed by a process according to an embodiment.

FIG. 3 shows a graph depicting example error scores computed according to the process of FIG. 1 for different candidate seasons. In the example of FIG. 3, the candidate seasons considered range from 0 to 168 hours. Each point in the graph plots the error score to the corresponding candidate season. Point 300 is associated with the minimum error score. In the example of FIG. 3, point 300 corresponds to a season of 24 hours. Thus, the temporal data from which the error scores of FIG. 3 were derived has a seasonality of 24 hours.

Figure 4:
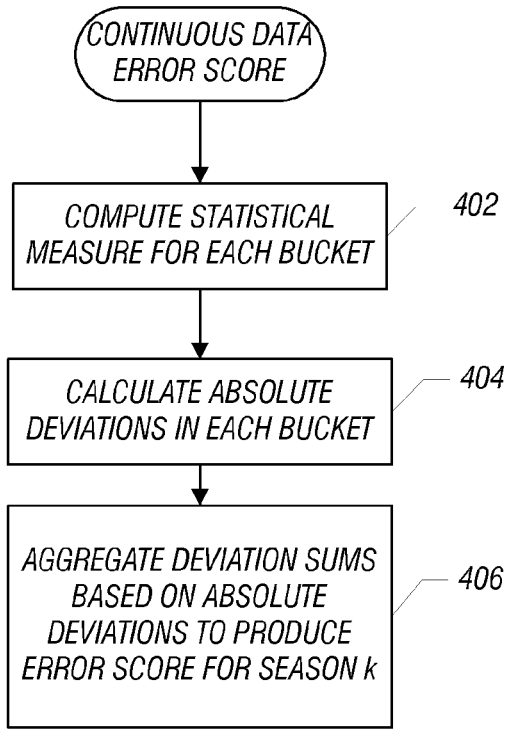
FIG. 4 is a flow diagram of a process of computing error scores for continuous temporal data, according to an embodiment.
Figure 5:
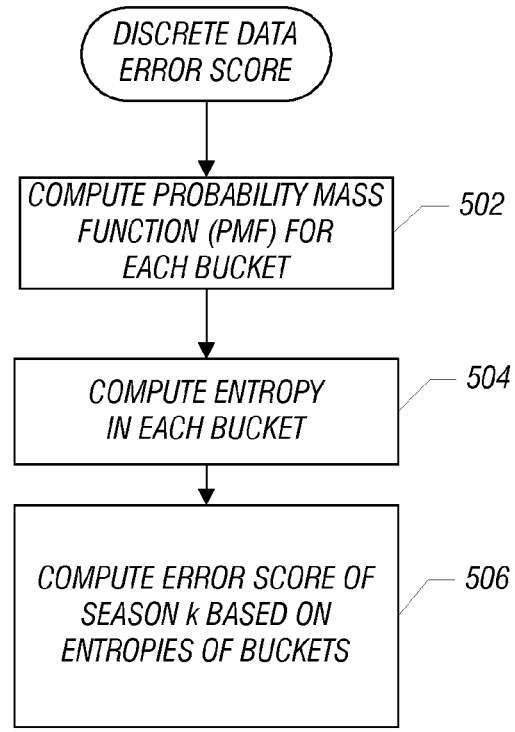
FIG. 5 is a flow diagram of a process of computing error scores for discrete temporal data, according to another embodiment.

As noted above, computation of the error scores is different depending upon whether the temporal data is continuous or discrete data. FIG. 4 is a flow diagram of computing an error score, error(k), for season k if the temporal data is continuous, while FIG. 5 is a flow diagram of computing an error score, error(k), for season k if the temporal data is discrete.

In FIG. 4, for each bucket i of the season being considered, a statistical measure is computed (at 402). In one example, the statistical measure is the median of the data samples assigned to the bucket. In other examples, the statistical measure can be an average of the data samples, a standard deviation of the data samples, or some probability distribution of the data samples.

The absolute deviations between the data samples of a bucket and the statistical measure (e.g., median) of the bucket are then calculated (at 404). These absolute deviations calculated for a particular bucket are summed to produce a corresponding deviation sum: Deviation_Sum(i)=Σ|D_i(j)−med_i|, where med_i represents the median for bucket i, D_i(j) represents data sample j in bucket i, where i=1 to $N_{b_k}$ (the number of buckets), and j=1 to numData (number of data samples in bucket i).

The deviation sums, Deviation_Sum(i), for the buckets are in turn aggregated (at 406), such as by summing, to produce an error score, error(k), for the corresponding candidate season k. Summing the deviation sums is performed as follows to produce error score, error(k), for season k is as follows:

$$\text{error}(k) = \sum_{i=1}^{N_{b_k}} \text{Deviation\_Sum}(i).$$

In an alternative implementation, to avoid overfitting, the seasonality detection algorithm performs n-fold cross validation when computing the absolute deviations between data samples in a bucket and the corresponding statistical measure of the bucket. With n-fold cross validation, the data samples in each bucket are partitioned into n groups randomly (n>1). The statistical measure is then calculated on n−1 groups, with the absolute deviation computed on the remaining group. The process is then repeated for each of the n groups.

FIG. 5 illustrates computation of the error score if the temporal data is discrete data. In one embodiment, the error measure used for discrete temporal data is the average over the entropies of the data samples in each bucket. A probability mass function (PMF) is computed (at 502) based on the data samples in the bucket, $P_{b_k} = \{p_{v[v]b_k}\}_{v=1}^{length(V)}$, where $p_{v[v]b_k}$ is the probability of value V[v] in the $b_k$ bucket (where k is the season), where v is an index into V, which is an array of distinct values found in the data, and length(V) represents the length of V. The PMF is one example of a statistical measure computed for each $b_k$ bucket. In other implementations, other statistical measures can be used.

The entropy of the data samples in each bucket based on the PMF is then computed (at 504):

$$H(P_{b_k}) = \sum_{v=1}^{V} p_{vb_k} \log p_{vb_k}.$$

Next, the error score of season k is computed (at 506) as the average entropy of all buckets:

$$\text{error}(k) = \frac{1}{N_{b_k}} \sum_{i=1}^{N_{b_k}} H(P_{b_k}[i]).$$

Several techniques can be employed to estimate $p_{vb_k}$, which is the probability of value v in the $b_k$ bucket. In one simple technique, the number of data samples with value v in the $b_k$ bucket are counted and divided over the total number of data samples in the $b_k$ bucket. However, for large seasons, the number of samples in each bucket is reduced, which can make the estimates of $p_{vb_k}$ noisier and less reliable. To mitigate this effect, the algorithm can estimate $p_{vb_k}$ using Laplace-like smoothing, as follows:

$$p_{vb_k} = \frac{n_{vb_k} + s}{\sum_{i=1}^{V} n_{vb_k} + s \cdot V}, \text{ where } s = \frac{1}{\sqrt{N_{b_k}}}.$$

The smoothing above adds a small pseudo count, s, to each value in each bucket to ensure that when the number of data samples in a bucket is small, the distribution is close to uniform. In some embodiments, the value of s is chosen as a function of the number of buckets ($N_{b_k}$).

Figure 6:
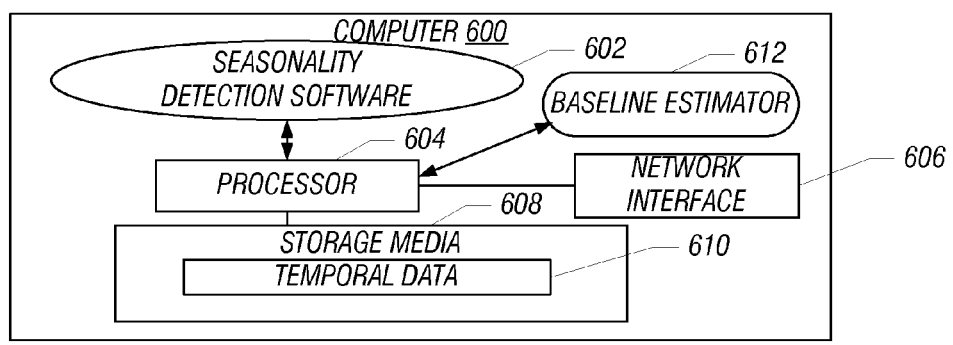
FIG. 6 is a block diagram of an exemplary computer in which an embodiment of the invention is incorporated.

FIG. 6 is a block diagram of an exemplary computer 600 in which an embodiment of the invention can be incorporated. The computer 600 includes a processor 604 and a storage media 608. The storage media 608 can be implemented with one or more disk-spaced storage devices and/or one or more integrated circuit or semiconductor memory devices. Note that "computer" can refer to either a single computer node or multiple computer nodes that can be distributed across one or more networks.

A seasonality detection software 602 is executable on the processor 604. The seasonality detection software 602 is able to take as temporal data 610 stored in the storage media 608 to identify a seasonality of the temporal data 610. The temporal data 610 may be received by the computer 600 through a network interface 606 of the computer 600 (from remote sources, such as monitors).

The computer 600 further includes a baseline estimator 612 executable on the processor 604. The baseline estimator 612 is used to perform baseline estimation of the temporal data once the dominant season has been found, which is the season associated with the minimum score discussed above.

Figure 7:
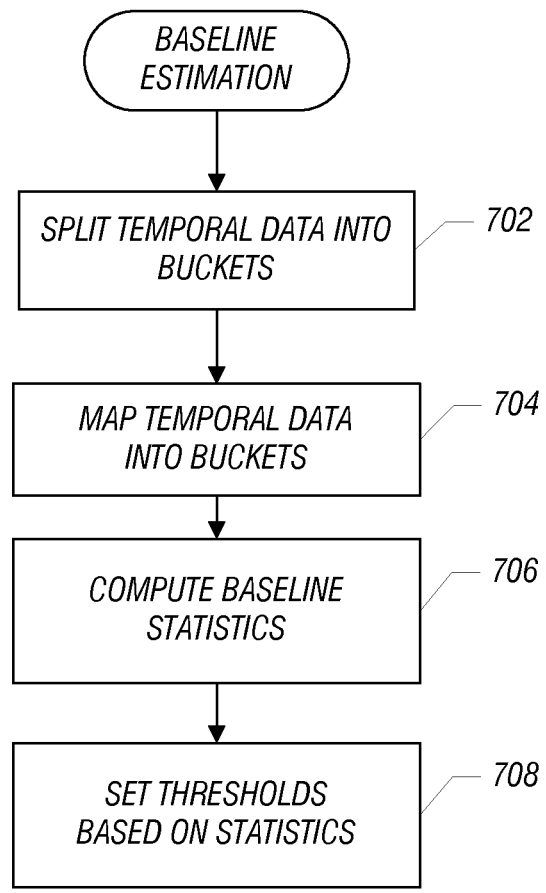
FIG. 7 is a flow diagram of a process of baseline estimation, according to an embodiment.

FIG. 7 shows a process of performing baseline estimation. The temporal data is split (at 702) into buckets of length t in time interval T (corresponding to the dominant season), where t≦T. Next, data samples of the temporal data are mapped (at 704) into the buckets, similar to the process depicted in FIG. 2. For each set of data samples in each bucket, baseline statistics are computed (at 706). Examples of baseline statistics include one or more of percentiles, average, and standard deviation.

Next, upper and lower thresholds for each bucket can be set (at 708) based on the computed statistics. Multiple levels of threshold (more than two) can be used based on the levels of anomalies to be detected.

Once the thresholds are set according the baseline estimation above, as a new data sample is received, it is mapped to a corresponding one of the buckets, and then compared to the thresholds of the mapped bucket to classify the new data sample as normal or abnormal.

Various enhancements of the algorithms discussed above may be provided. For example, the temporal data may be associated with trends. In some implementations, such trends in the temporal data are detected, such as by computing a periodic median of the temporal data and checking for a linear trend by estimating the best linear regression over aggregated data. Removing trends from the temporal data allows for more accurate identification of seasonality in the temporal data.

Also, in some cases, the temporal data may be associated with multiple seasons. One technique of detecting multiple seasons is to detect the most dominant season using the algorithms as discussed above. This most dominant season is then removed from the temporal data, such as by using filtering, averaging, or other technique. Then the next most dominant season is identified, and the process is repeated.

It is also possible that the seasons are non-linear—in other words, the seasons do not repeat but change over time. To address this, the time scale could be warped to a linear scale and then the techniques according to some embodiments can be applied.

Instructions of software described above (including the classifier training module 102, feature shaping module 103, and classifier 110 of FIG. 1) are loaded for execution on a processor (such as processor 104 in FIG. 1). The processor includes microprocessors, microcontrollers, processor modules or subsystems (including one or more microprocessors or microcontrollers), or other control or computing devices. As used here, a "processor" can refer to a single component or to plural components (e.g., one CPU or multiple CPUs across one or multiple computers).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of determining a seasonal effect in temporal data, comprising:
    receiving the temporal data relating to an aspect of an enterprise;
    for each of a plurality of candidate seasons, performing, by a computer:
        defining an interval for the corresponding candidate season,
        dividing the interval into plural buckets containing respective sets of the temporal data,
        computing statistical measures for corresponding buckets, and using the computed statistical measures to compute an error score for the corresponding candidate season, wherein computing the error score comprises:
            within each of the buckets, applying a mathematical function based on temporal data values in the bucket and the statistical measure for the bucket to produce an output value; and
            aggregating the output values produced for the buckets to compute the error score,
    wherein scores computed for corresponding candidate seasons are used for identifying which of the candidate seasons represents the seasonal effect of the temporal data.

2. The method of claim 1, wherein computing the statistical measures comprises computing statistical measures selected from the group consisting of a median, average, standard deviation, and a probability distribution.

3. The method of claim 1, wherein applying the mathematical function comprises computing absolute deviations of the temporal data values in the bucket from the statistical measure of the bucket, and summing the absolute deviations for corresponding buckets to produce the corresponding output value.

4. The method of claim 1, further comprising:
after identifying the season associated with the temporal data, estimating a baseline for the temporal data, wherein estimating the baseline includes:
dividing an interval of the identified season into buckets;
mapping the temporal data into the buckets of the interval of the identified season;
computing statistics based on temporal data values in the buckets of the interval of the identified season; and
computing thresholds based on the statistics.

5. The method of claim 4, further comprising:
receiving a new data sample; and
comparing the new data sample to the thresholds to determine whether the new data sample is normal or abnormal.

6. A method of determining a seasonal effect in temporal data, comprising:
receiving the temporal data relating to an aspect of an enterprise;
for each of a plurality of candidate seasons, performing, by a computer:
defining an interval for the corresponding candidate season,
dividing the interval into plural buckets containing respective sets of the temporal data,
computing probability mapping functions for corresponding buckets,
computing an entropy based on the probability mapping function for each bucket, and
using the entropies to compute a score for the corresponding candidate season
wherein scores computed for corresponding candidate seasons are used for identifying which of the candidate seasons represents the seasonal effect of the temporal data.

7. A method of determining a seasonal effect in temporal data, comprising:
receiving the temporal data relating to an aspect of an enterprise;
for each of a plurality of candidate seasons, performing, by a computer:
defining an interval for the corresponding candidate season,
dividing the interval into plural buckets containing respective sets of the temporal data,
computing statistical measures for corresponding buckets,
using the computed statistical measures to compute a score for the corresponding candidate season, and
selectively using different techniques for computing the score based on whether the temporal data is continuous or discrete,
wherein scores computed for corresponding candidate seasons are used for identifying which of the candidate seasons represents the seasonal effect of the temporal data.

8. A computer comprising:
a storage media to store temporal data and
a processor to:
define a set of candidate seasons having respective different lengths;
for each of the candidate seasons in the set, compute a score based on division of the temporal data into plural buckets that are within an interval of the corresponding candidate season, wherein statistical measures are computed for the corresponding plural buckets to enable computation of the score, wherein the processor is configured to further, for each of the buckets, compute an absolute deviation between each temporal data value in the bucket and the statistical measure of the bucket, wherein the score is computed based on the absolute deviations of the buckets; and
compare the scores of the corresponding candidate seasons to identify one of the candidate seasons as representative of a seasonality of the temporal data.

9. A computer comprising:
a storage media to store temporal data and
a processor to:
define a set of candidate seasons having respective different lengths;
for each of the candidate seasons in the set, compute a score based on division of the temporal data into plural buckets that are within an interval of the corresponding candidate season, wherein statistical measures are computed for the corresponding plural buckets to enable computation of the score, wherein the processor is configured to further, for each of the buckets, compute an entropy based on the statistical measure of the bucket, wherein the score is computed based on the entropies of the buckets; and
compare the scores of the corresponding candidate seasons to identify one of the candidate seasons as representative of a seasonality of the temporal data.

10. A computer comprising:
a storage media to store temporal data; and
a processor to:
define a set of candidate seasons of arbitrary length;
for each of the candidate seasons in the set, compute a score based on division of the temporal data into plural buckets that are within an interval of the corresponding candidate season, wherein statistical measures are computed for the corresponding plural buckets to enable computation of the score; and
compare the scores of the corresponding candidate seasons to identify one of the candidate seasons as representative of a seasonality of the temporal data,
wherein the temporal data comprises one of continuous data and discrete data acquired without regular sampling intervals.

11. An article comprising at least one non-transitory computer readable storage medium containing instructions that upon execution cause a computer to:
receive temporal data relating to an aspect of an enterprise;
for each of a plurality of different candidate seasons:
define a time interval for the corresponding candidate season;
divide the time interval into plural time buckets containing respective sets of the temporal data,
compute statistical measures for the corresponding time buckets, and
use the computed statistical measures to compute a score for the corresponding candidate season,
wherein scores computed for corresponding candidate seasons are used for identifying which of the candidate seasons represents a seasonal effect of the temporal data.

12. The article of claim 11, wherein the instructions upon execution cause the computer to further:
compute absolute deviations based on temporal data values in each time bucket and the corresponding statistical measure of the time bucket,
wherein the score is computed based on the absolute deviations.

13. The article of claim 11, wherein the instructions upon execution cause the computer to further:
compute an entropy based on temporal data values in each time bucket and the corresponding statistical measure of the time bucket,
wherein the score is computed based on the entropies.

14. The article of claim 13, wherein the statistical measure is a probability mass function.

15. The article of claim 11, wherein the instructions upon execution cause the computer to further selectively use different techniques for computing the score based on whether the temporal data is continuous or discrete.

16. The article of claim 11, wherein the time intervals of the corresponding different candidate seasons have different lengths.

\* \* \* \* \*

UNITED STATES PATENT AND TRADEMARK OFFICE
CERTIFICATE OF CORRECTION

PATENT NO.         : 8,468,161 B2
APPLICATION NO.    : 13/259020
DATED              : June 18, 2013
INVENTOR(S)        : Ira Cohen et al.

Page 1 of 1

It is certified that error appears in the above-identified patent and that said Letters Patent is hereby corrected as shown below:

In the Claims:

In column 7, line 39, in Claim 6, delete "season" and insert -- season, --, therefor.

In column 8, line 19, in Claim 9, delete "data" and insert -- data; --, therefor.

Signed and Sealed this
Fifth Day of November, 2013

Teresa Stanek Rea
*Deputy Director of the United States Patent and Trademark Office*